US012586146B2

(12) United States Patent
Harada et al.

(10) Patent No.: US 12,586,146 B2
(45) Date of Patent: Mar. 24, 2026

(54) PROGRESSIVE MATERIAL CACHING

(71) Applicant: Advanced Micro Devices, Inc., Santa Clara, CA (US)

(72) Inventors: Takahiro Harada, Santa Clara, CA (US); Shin Fujieda, Tokyo (JP)

(73) Assignee: Advanced Micro Devices, Inc., Santa Clara, CA (US)

( * ) Notice: Subject to any disclaimer, the term of this patent is extended or adjusted under 35 U.S.C. 154(b) by 142 days.

(21) Appl. No.: 18/503,934

(22) Filed: Nov. 7, 2023

(65) Prior Publication Data

US 2025/0148565 A1 May 8, 2025

(51) Int. Cl.
| | |
|---|---|
| *G06T 1/60* | (2006.01) |
| *G06F 16/22* | (2019.01) |
| *G06T 15/04* | (2011.01) |
| *G06T 15/06* | (2011.01) |
| *G06T 17/00* | (2006.01) |

(52) U.S. Cl.
CPC ............ *G06T 1/60* (2013.01); *G06F 16/2255* (2019.01); *G06T 15/04* (2013.01); *G06T 15/06* (2013.01); *G06T 17/005* (2013.01)

(58) Field of Classification Search
None
See application file for complete search history.

(56) References Cited

U.S. PATENT DOCUMENTS

| | | | | | |
|---|---|---|---|---|---|
| 6,549,210 | B1 * | 4/2003 | Van Hook | ............... | G06T 15/04 |
| | | | | | 711/2 |
| 2012/0069023 | A1 * | 3/2012 | Hur | ....................... | G06T 15/005 |
| | | | | | 345/426 |

| | | | | | |
|---|---|---|---|---|---|
| 2015/0089151 | A1 * | 3/2015 | Bolz | ................... | G06F 12/0815 |
| | | | | | 711/141 |
| 2018/0061111 | A1 * | 3/2018 | Engel | ...................... | G06T 15/08 |
| 2018/0165868 | A1 * | 6/2018 | Kettner | ................ | G06T 15/506 |
| 2020/0013174 | A1 * | 1/2020 | Uralsky | .................... | G06T 7/44 |
| 2022/0284657 | A1 * | 9/2022 | Müller | .................. | G06N 3/084 |
| 2022/0335682 | A1 * | 10/2022 | Dave | ...................... | G06N 3/045 |
| 2022/0365786 | A1 * | 11/2022 | Alfieri | .................. | G06F 9/3867 |

(Continued)

OTHER PUBLICATIONS

Pineda, Steven. Exploring Material Representations for Sparse Voxel Dags. MS thesis. California Polytechnic State University, 2021.*

*Primary Examiner* — Sultana M Zalalee

(74) *Attorney, Agent, or Firm* — Hickman Becker Bingham Ledesma LLP

(57) ABSTRACT

With minimal preprocessing of trees of materials in textures, this approach progressively caches outputs of some material nodes that are evaluated while rendering a scene. A node may be the root of a subtree, and the node may generate a value of a texel based on values of other nodes in the subtree. The subtree of a cacheable node contains no shading-point dependent node as a descendant other than texture coordinates. When reaching the cacheable node during a material evaluation for rendering, a descriptor of the node is used as a key to store or reuse the texel value of the cacheable node in a materials cache in memory. By defining cacheable nodes at highest possible levels in a tree, repeated evaluation of most nodes in the tree is avoided. For multithreaded acceleration, a materials cache is designed for thread-safe operation with an atomic instruction.

20 Claims, 7 Drawing Sheets

(56) References Cited

U.S. PATENT DOCUMENTS

| | | | | |
|---|---|---|---|---|
| 2023/0126531 A1* | 4/2023 | Croxford | ................ | G06T 15/06 |
| | | | | 345/418 |
| 2023/0360310 A1* | 11/2023 | Guerrero | .............. | G06T 11/001 |
| 2023/0410425 A1* | 12/2023 | Aluru | .................. | G06N 3/0495 |
| 2024/0104845 A1* | 3/2024 | Gautron | .................... | G06T 1/60 |
| 2024/0212258 A1* | 6/2024 | Bao | ........................ | G06T 15/04 |
| 2024/0257437 A1* | 8/2024 | Vaidyanathan | ........... | G06T 7/40 |

* cited by examiner

COMPUTER-GENERATED IMAGING SYSTEM 200

COMPUTER-GENERATED IMAGE 220

PIXELS 231

PIXELS 232

PIXELS 233

MATERIAL TREE 210

MATERIAL TREE 300

FIG. 5

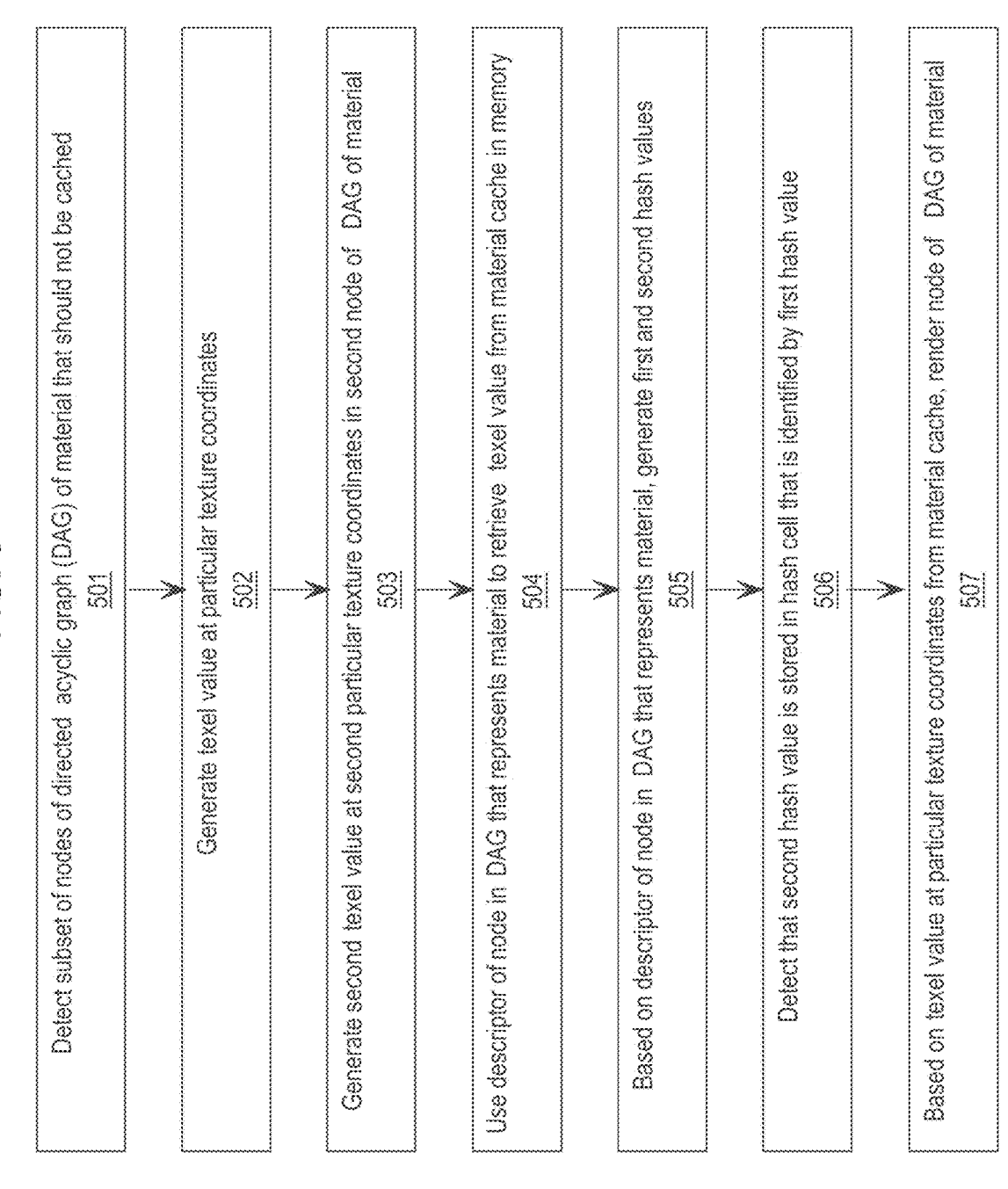

Detect subset of nodes of directed acyclic graph (DAG) of material that should not be cached
501

Generate texel value at particular texture coordinates
502

Generate second texel value at second particular texture coordinates in second node of DAG of material
503

Use descriptor of node in DAG that represents material to retrieve texel value from material cache in memory
504

Based on descriptor of node in DAG that represents material, generate first and second hash values
505

Detect that second hash value is stored in hash cell that is identified by first hash value
506

Based on texel value at particular texture coordinates from material cache, render node of DAG of material
507

PROGRESSIVE MATERIAL CACHING

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Modern three dimensional (3D) modeling software helps artists create their desired scenes using node-based materials, which make editing these materials more intuitive and flexible. Due to this node-based system, most scenes in production rendering usually contain hundreds or thousands of materials with large material networks. Rendering these scenes requires evaluating complex materials, which is generally a very resource-intensive operation that often can be the bottleneck of rendering performance. For example, the same complex network may be evaluated many times, which is redundant and suboptimal, during a rendering process, because interactions of lighting and scaling may cause adjacent rays from a same light source to strike a same area of the material and thus redundant evaluations of the material network. To alleviate this computational bottleneck, some activities may be moved out of a critical path of rendering and instead into slow preprocessing of every node in the material to generate texture maps or per-vertex data. However, this preprocessing requires some additional computer resources and cannot exhaustively preprocess every node in a material network because some nodes require information about a target object to be rendered at a shading location, which is information that may be unknown during preprocessing before rendering.

BRIEF DESCRIPTION OF THE DRAWINGS

Implementations are depicted by way of example, and not by way of limitation, in the figures of the accompanying drawings and in which like reference numerals refer to similar elements.

FIG. 1 depicts an example computing architecture that includes a path tracer executing on a processor communicatively coupled to a memory that contains a materials cache.

FIG. 5 depicts an example computer process that a path tracer may perform in a computing architecture to render an image based on specified texture(s) and material(s).

DETAILED DESCRIPTION

Figure 2:
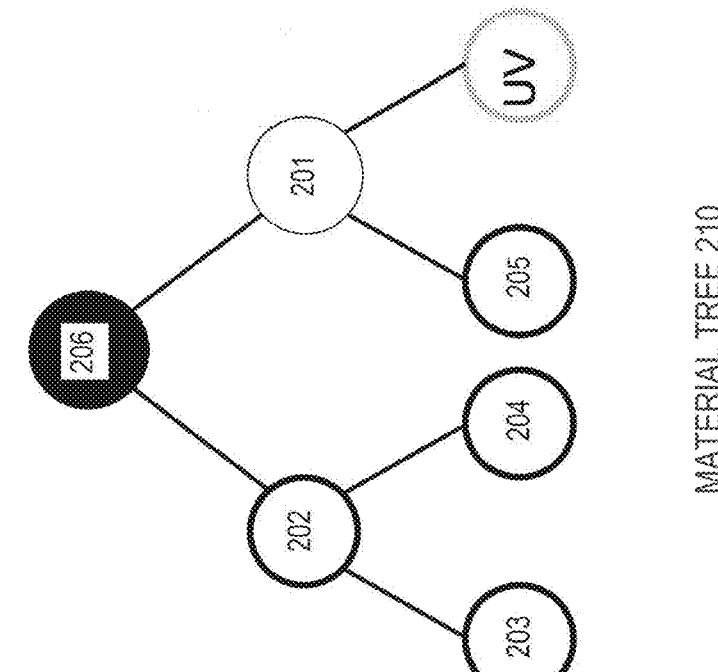
FIG. 2 depicts an example computer-generated imaging system having a path tracer that provides ray tracing, shading, and texturing based on a description of a scene to be rendered.

In the following description, for the purposes of explanation, numerous specific details are set forth in order to provide a thorough understanding of the implementations. It will be apparent, however, to one skilled in the art that the implementations may be practiced without these specific details. In other instances, well-known structures and devices are shown in block diagram form in order to avoid unnecessarily obscuring the implementations.

I. Overview
II. Architecture
III. Path Tracing with Materials Cache
    A. Material Tree
    B. Materials Cache
    C. Optimal Cacheable Subset of Nodes
    D. Hash Table for Materials Cache
    E. Parallelism for Acceleration
    F. Example Rendering Process
    G. Acceleration and Anti-aliasing with Virtual Texture I. Overview With minimal preprocessing of trees of a material that may contain texture(s), this approach progressively caches outputs of some material nodes that are evaluated while rendering a scene during image generation. A node may be the root of a subtree of the material tree, and evaluation of the node may generate a value of a texture element (texel) based on values of other nodes in the subtree. The subtree of a cacheable node contains no descendant node that depends on attributes other than the texture coordinates at a shading location in the image being generated. When reaching the cacheable node during a material evaluation for rendering, a descriptor of the node is used as a key to store or reuse the value of the cacheable node in a materials cache in computer memory. By defining cacheable nodes at highest possible levels in a tree, repeated evaluation of most nodes in the tree is avoided, which provides acceleration. For additional acceleration by multithreading, a materials cache is designed for thread-safe operation with an atomic instruction.

II. Architecture

Figure 1:
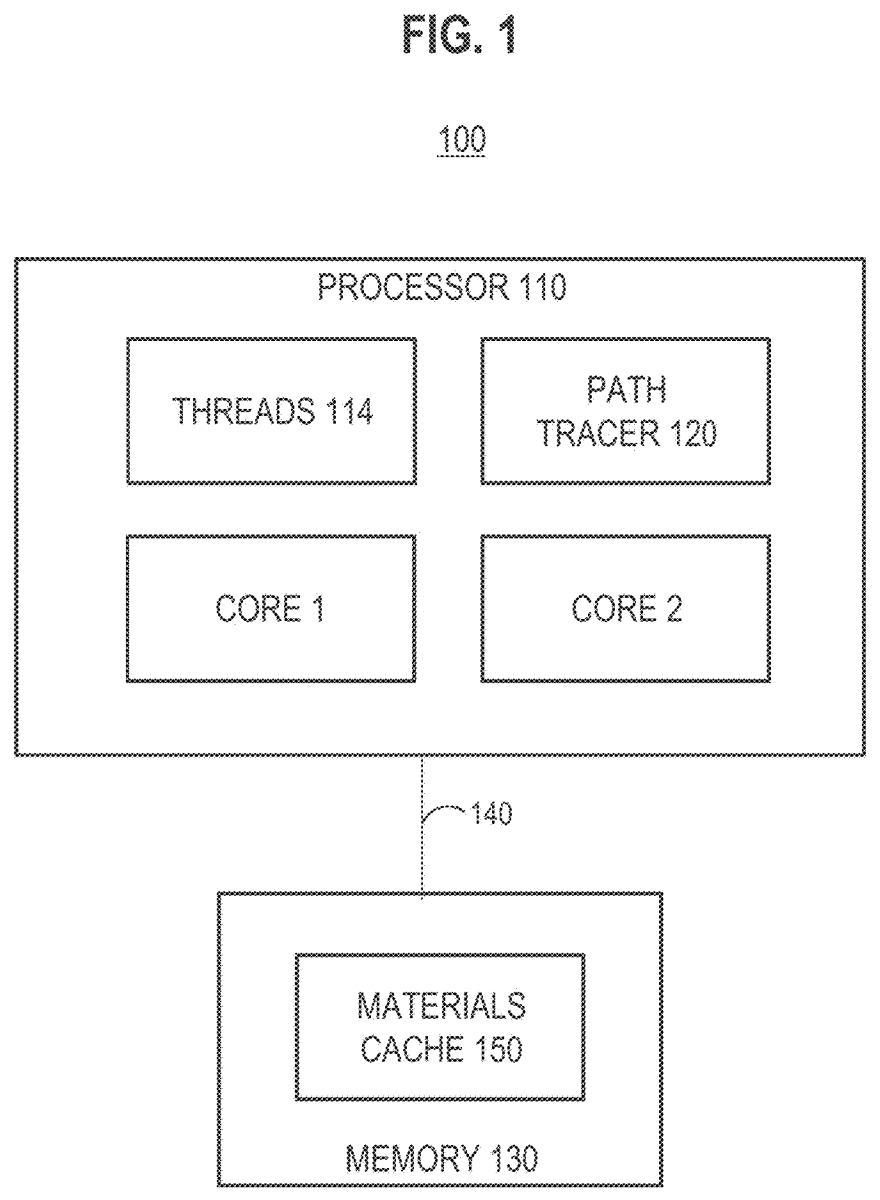

FIG. 1 depicts an example computing architecture 100 that includes a processor 110 communicatively coupled to a memory 130, for example via a memory interface 140. The processor 110 is any type of processor, such as a Central Processing Unit (CPU), a Graphics Processing Unit (GPU), an Application-Specific Integrated Circuit (ASIC), a System on a Chip (SoC), etc. The memory 130 is any type of memory, such as a Dynamic Random Access Memory (DRAM) or a Processor-In-Memory (PIM)-enabled memory, such as one or more PIM-enabled DRAM modules. As depicted in FIG. 1, the memory 130 stores data structures and content that are used in graphical path tracing operations, as described in more detail hereinafter.

The processor 110 includes two cores, identified in FIG. 1 as "Core 1" and "Core 2," but implementations are not limited to processors with any particular number of cores and may have a single core or more than two cores. The processor 110 includes other elements that are not depicted in the figures or described herein for purposes of explanation, such as a memory controller, an Arithmetic and Logical Unit (ALU), buffers, data, address, control buses, etc., that vary depending upon a particular implementation.

The processor 110 also includes computational threads 114. Each thread may execute on a respective one of cores 1-2. A thread may be a unit of concurrency in an implementation. The memory 130 and/or circuitry of processor 110 may contain an implementation of path tracer 120. For example, path tracer 120 may contain machine instructions that processor 110 may load from memory 130 or elsewhere and execute. In other examples, the path tracer 120 may comprise circuitry that performs the functions of a path tracer without the execution of instructions or in combination with the execution of instructions. In yet other examples, the path tracer 120 may not be a part of the processor but instead may be circuitry that is part of the architecture 100 and directly or indirectly connected to the processor 110. In such examples the path tracer 120 may be implemented, for example, as a co-processor, an FPGA, or custom circuitry that implements the functionality of the path tracer 120.

For creation of photorealistic computer generated images, path tracer 120 provides ray tracing, shading, and texturing based on descriptive content of a scene to be rendered. For example, path tracer 120 may retrieve descriptive content from memory 130 and generate a corresponding graphical image into memory 130. In an example, memory 130 buffers a graphical image for display on a display device that is attached to computer architecture 100. For novel acceleration of scene image generation, path tracer 120 operates materials cache 150 in memory 130 to reuse previously calculated values.

III. Path Tracing with Materials Cache

A. Material Tree

FIG. 2 depicts an example computer-generated imaging system 200 that is an implementation of computing architecture 100. Path tracer 120 provides ray tracing, shading, and texturing based on a description of a scene to be rendered. The scene description includes example material tree 210 that is a material network such as a directed acyclic graph (DAG) or tree data structure in memory 130 that describes a material that contains one or more textures or, in some cases, no texture. A texture defines surface structure such as fur. Materials have attributes that path tracer 120 processes to adjust content rendering aspects such as color and brightness.

Also in memory 130 is computer-generated image 220 and an associated image buffer into which path tracer 120 may store a resulting rendered image. In some implementations, the memory buffer that contains computer-generated image 220 has a linear address space for storing value(s) of each picture element (pixel) of a rendered two-dimensional image. For example, computer-generated image 220 may reside in a frame buffer, and the rendered image may or may not contain various content planes such as for respective color channels. In one example, the value of a pixel is a red green blue (RGB) triplet of numeric values.

The value of each pixel or each set of adjacent pixels is provided by path tracer 120 that may generate a value by evaluating all of material tree 210. Instead of repeatedly generating a same value, path tracer 120 may store and reuse previously calculated values in materials cache 150. For example, path tracer 120 may render a scene that contains a chair that should be decorated with a fur material that contains a spotted texture. In that case, some or all rendered details of the spotted fur material may be copied from materials cache 150 to reuse for repeatedly painting different regions of image 220.

For example, pixels 231-233 each is a set of adjacent pixels such as a triangle or other polygon. To render pixels 231-233 with the same texture and material, path tracer 120 may repeat evaluations of material tree 210 or cache and reuse values from a small set of evaluations. Material tree 210 is composed of nodes that specify graphical processing operations that path tracer 120 should perform during evaluation to render the material and texture. Evaluating a node entails invoking the operation of the node, which may entail processing latency. Evaluating a subtree entails evaluating all of the nodes in the subtree.

For example, node 206 is the root of material tree 210, and node 201 is the root of a subtree that contains nodes 201, 205, and UV. Nodes 203-205 are leaf nodes whose only operation typically is to provide processing parameters and inputs. For example, leaf node UV is a texture coordinates node that specifies a location in the texture. U and V are unit-normalized axes in a two dimensional space in which the texture (i.e. not the scene) is defined. For example if the texture is a repeating texture, then leaf node UV might have a same value regardless of which of pixels 231-233 is leaf node UV evaluated for. Leaf node UV may instead have a distinct respective value for each of pixels 231-233, such as when pixels 231-233 map to different regions of the texture that should not be identically rendered.

B. Materials Cache

Nodes in material tree 210 may be specialized for different respective operations. Likewise, those different kinds of nodes may evaluate to different respective logical data types. Nodes that evaluate to a value of a texture element (texel) may have their values stored in materials cache 150. For example, evaluation of root node 206 may generate a texel value based on all of the nodes of material tree 210. That texel value can be used to render pixels 231-233. If pixels 231-233 are rendered in sequence then, for pixels 231, path tracer 120 may use post-order or pre-order traversal to evaluate all of the nodes of material tree 210 to generate the texel value of node 206. Path tracer 120 may store that texel value in materials cache 150 and reuse that texel value for accelerated subsequent rendering of other pixels 232-233 (or pixels 231 again) without reevaluating any of nodes 205-206 and UV. Herein, respective texel values for a same texel may be generated by different respective nodes in material tree 210, and those texel values may have different data types, be used for different purposes, and affect rendering of the texel in different ways.

Materials cache 150 associates an identifier of a respective node with each cached texel value that is generated by the node. Path tracer 120 provides the node identifier when storing or retrieving a texel value in materials cache 150. Depending on the example, materials cache 150 stores texel values for only one material tree of one material or for multiple material trees of multiple respective materials, in which a material identifier should also be provided when storing or retrieving a texel value in materials cache 150.

Materials cache 150 associates a respective texture coordinates (e.g. UV) value with a cached texel value. For example if pixels 231-232 map to a first UV point in the texture and pixels 233 instead maps to a second UV point in the texture, then path tracer 120 may store two texel values in materials cache 150 respectively for both UV points. Thus, which texel value is retrieved from materials cache 150 depends on which UV coordinates value is used as a portion of a lookup key.

C. Optimal Cacheable Subset of Nodes

Figure 3:
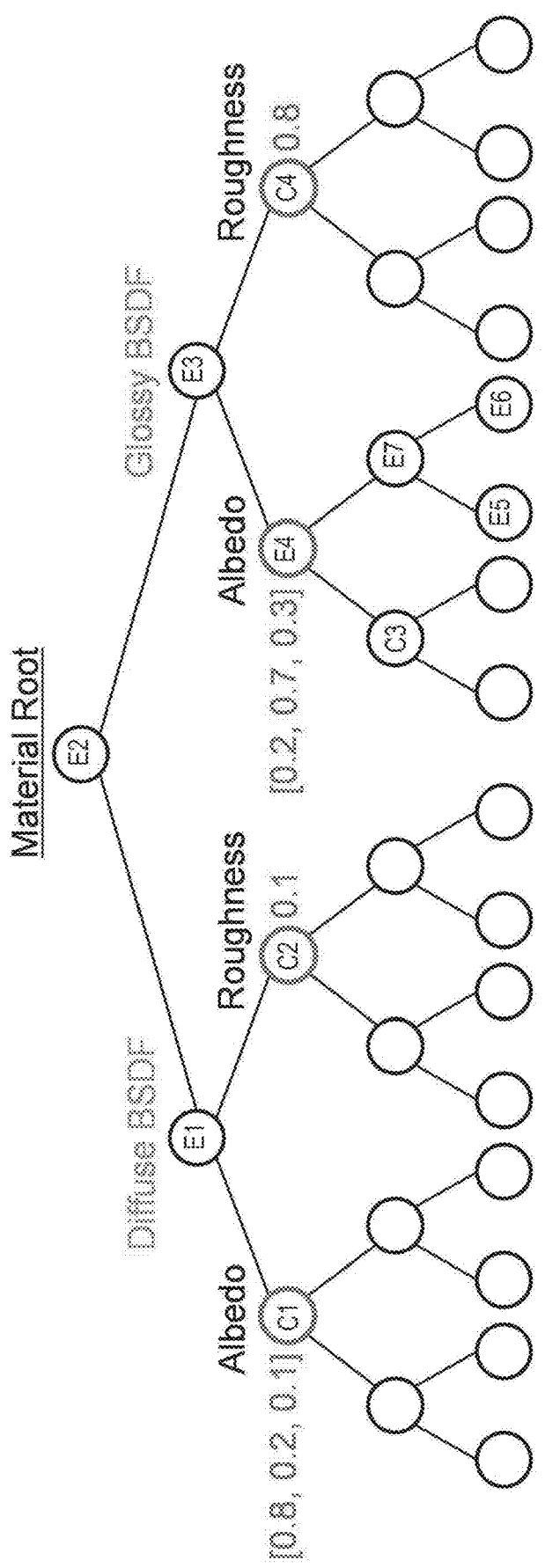
FIG. 3 depicts an example material tree that a path tracer may process to render a scene.

FIG. 3 depicts example material tree 300 that an implementation of path tracer 120 may process to render a texture in a material in a scene. Material tree 300 contains many nodes, all of which can be evaluated. Evaluation and caching of nodes by path tracer 120 is progressive (i.e. lazy), which means that material tree 300 may be operated without prefetching of cacheable texel values to prefill materials cache 150.

A node whose texel value is cached need be evaluated only once (before caching). However, a value of a node that is not a texel value should not be cached. Likewise, a texel value that cannot be reused should not be cached. For example, if a node that generated a texel value depends on descendant nodes in the node's subtree, and at least one of those descendent nodes' values should not be reused, then the texel value of the node should not be cached. A (e.g. leaf) node in the subtree may have a value that varies depending on which pixel is being rendered in the image, and that leaf node may prevent the root node of any enclosing subtree from being cacheable. For example, an aspect of leaf node E5 may prevent caching of the texel value of albedo node E4. Path tracer 120 may detect that a node of material tree 300 is cacheable because the node is a root of a subgraph (e.g. subtree) of material tree 300 that does not contain any node that depends on any attribute of a shading point that is not a texture coordinates of the shading point in the image being generated.

In this example, only nodes C1-C4 are cacheable, which means that each of nodes C1-C4 is the root of a respective subtree whose nodes need evaluation only once, and the resulting texel values of nodes C1-C4 may be stored in materials cache 150 for reuse. Nodes E1-E7 are not cacheable and instead are reevaluated whenever needed. Before evaluating any of material tree 300, path tracer 120 may preprocess material tree 300 from bottom to top (i.e. leaf to root) to detect: a) which nodes prevent caching of texel values of which subtrees and b) which nodes can generate cacheable texel values.

In this example, the texel values of nodes C1-C2 have different respective datatypes that are both cacheable. The shown texel value of albedo node C1 may be an RGB triplet. The shown texel value of roughness node C2 may be a scalar magnitude. Operation of nodes E1 and E3 entails a bidirectional scattering distribution function (BSDF).

Reuse of a texel value from materials cache 150 avoids redundant reevaluation of nodes and redundant recalculation of texel values. Avoidance of redundant computation provides acceleration. Furthermore, most of the logic of path tracer 120 and threads 114 may be unaware of materials cache 150 by design. Most of the logic of path tracer 120 and threads 114 may disregard whether materials cache 150 is absent, empty, or full. All of the logic of path tracer 120 and threads 114 may be designed in advance as a particular set of so-called compute kernels that are units of work. In one example, computer architecture 100 may have a central processing unit (CPU) that prepares for rendering by generating a batch of compute kernels, and processor 110 is a graphics processing unit (GPU) that executes the compute kernels in parallel for acceleration.

In the state of the art, dynamic rendering of a scene may entail dynamic generation of various compute kernels for each material. For example, angle and occlusion may determine which surfaces are visible and which compute kernels to generate, which the state of the art does before actually rendering the image. Because path tracer 120 instead evaluates nodes and calculates texel values lazily and on demand, and because compute kernels herein tolerate cache misses and do not depend on which values of which texels are actually cached, there is no need herein to dynamically generate particular compute kernels (e.g. for a current viewing angle). Thus unlike the state of the art, path tracer 120 may be configured to operate without dynamically generating compute kernel(s) for a material. Avoiding such dynamic generation (e.g. between each frame of a motion picture) provides acceleration.

D. Hash Table for Materials Cache

Figure 4:
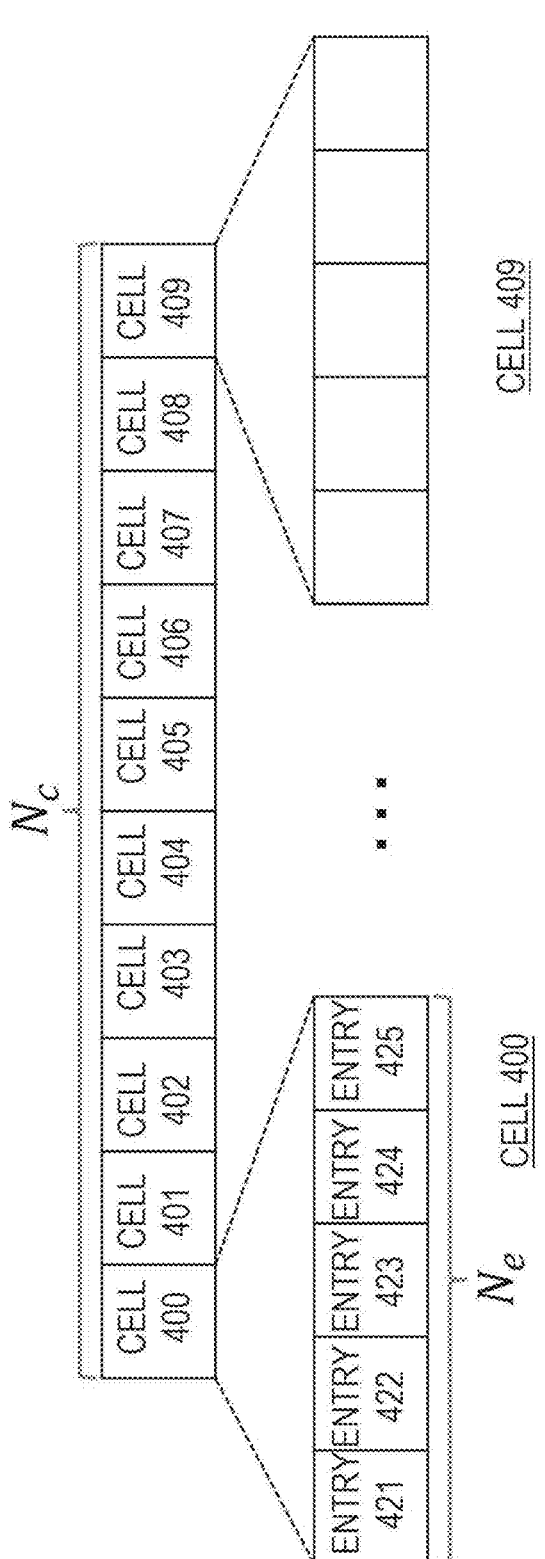
FIG. 4 depicts an example hash table that may be part of an implementation of a materials cache in memory.

FIG. 4 depicts example hash table 410 that may be part of an implementation of materials cache 150 in memory 130. Hash table 410 maps unique node descriptors of distinct texels to cached values of those texels. A node descriptor contains the identifier of the node, the identifier of the material, mipmap level as discussed later herein, and texel indices (i.e. UV coordinates, e.g. for a virtual texture as discussed later herein).

Because operating hash table 410 entails hashing a node descriptor to a number, an example hash function may be designed to expect a very large node descriptor that contains many fields. Hash table 410 uses two hash functions in separate respective ways. Using the node descriptor as a hash key, for each of two levels, a distinct respective hash function generates a separate respective hash value (i.e. hash code) for use as discussed below.

Hash table 410 is not fragmented in memory and is self-contained. For example, hash table 410 does not contain any pointers even when fully populated. Use of hash table 410 is accelerated because the use does not entail so-called pointer chasing by repeated indirection and dereferencing such as for a linked list. Hash table 410 is stored as a flattened and contiguous array of cells 401-409 that are operated as hash buckets. Each cell (i.e. hash bucket) contains a respective fixed-size array of entries. For example, cell 400 contains entries 421-425. Entries of a cell are stored contiguous to entries of an adjacent cell. For example, a same address range within memory 130 may be operated as a one-dimensional array of cells 401-409 or as a one-dimensional array of $N_c \times N_e$ entries.

Hash table 410 contains an array whose elements are cells 400-409 that can be randomly accessed by cell offset, which is a zero-based offset in which zero is the offset of cell 400 and nine is the offset of cell 409. The first hash function generates a first hash value that can be used as a cell offset to identify and access a particular cell. The first hash function may use arithmetic modulo of $N_c$ that is a count of cells 400-409 in hash table 410. Multiple distinct hash keys (i.e. node descriptors) may have a same first hash value that identifies a same cell, which is a collision. When multiple hash node descriptors hash to a same cell offset that identifies a same cell, collisions are disambiguated by inspecting the contents of the cell as a hash bucket that is an array of entries. For example, cell 400 contains entries 421-425.

An entry is a compound data structure that contains the texel value and, as generated by the second hash function, the second hash value of the hash key of the texel value. Each entry is self-contained and does not contain a pointer. An entry, its texel value, and the second hash value of the entry are stored inline (i.e. directly) in the cell and contiguous to other entries in the cell. Depending on the implementation, the first hash value may contain more bytes than the second hash value contains, or vice versa. Depending on the implementation, the first hash function may have a larger numeric range than the second hash function, or vice versa.

An entry that currently does not store a value is empty. None, some, or all of entries 421-425 may be empty. An empty entry has a predefined invalid value for the texel value or the second hash value. Neither hash table 410 nor its cells 400-409 can contain multiple entries that have a same second hash value. The first hash value is not stored.

Hash table 410 and materials cache 150 may provide invokable operations such as insertion of a new entry and lookup of an existing entry to reuse its texel value. These operations are available during all rendering phases including image generation and preprocessing and evaluation of textures and materials.

E. Parallelism for Acceleration

For insertion and lookup respectively, searching for an empty entry or the entry having the second hash value of a particular hash key may entail linear scanning until a match is found in the entries of a cell. A miss occurs if the cell does not contain the second hash value of the particular hash key. Overflow is detected if the cell does not contain an empty entry to store a new entry during an attempted insert and, without changing the semantics of image rendering by path tracer 120, the insert may be quietly ignored instead of executed. In other words, a previously cached entry (e.g. for a different texel) would not be evicted from the cell, and the new entry does not replace the previous entry in the cell. A miss or an overflow may be the worst case time complexity of hash table 410, which may entail linear bucket scanning bounded by $N_e$ that is a count of entries 421-425 in cell 400. Worst case complexity instead is constant if the instruction set architecture (ISA) of processor 110 provides single instruction multiple data (SIMD) that may concurrently inspect all entries in the cell to find a match.

As explained earlier herein, processor 110 may execute many threads 114 for acceleration. For example, path tracer 120 may be multithreaded and each rendered pixel or each generated texel value or each evaluated node may have its own thread, and there may be hundreds or thousands of threads. For example, path tracer 120 may have a separate thread for each ray or ray source that affect a same pixel. Threads 114 may be numerous and contentious such that data consistency of materials cache 150 may need configuration or coordination for thread safety.

For example, two threads may fail to retrieve an uncalculated value of a same texel from materials cache 150. Immediately after the failures, both threads may independently and redundantly decide to generate the same missing texel value. As explained earlier herein, hash table 410 may implement materials cache 150, and each entry in hash table 410 may be a multibyte data structure that is not inherently thread safe. For example, two threads may calculate different respective values for a same texel. If the two racing threads concurrently attempt to cache respective values of that same texel, one thread may write some of the byte(s) of the texel value into hash table 410 and the other thread may instead write other byte(s) of a different value for the same texel. The result may be a so-called torn entry that contains a bogus value that is an unintended mixture of bytes from concurrent writes by contending threads. In another erroneous example, both threads concurrently insert a respective new value for a same texel in a same cell, but into two respective empty entries, which may cause duplicate entries. Various failure modes of various race conditions may be prevented as follows.

Path tracer 120 may use an atomic hardware instruction in the ISA of processor 110 to write (i.e. insert or update) an entry in hash table 410 such as a compare-and-swap (CAS) instruction. For example, a 64-bit entry may consist of a 32-bit texel value and a 32-bit second hash value as discussed earlier herein, and a CAS instruction may atomically write the 64-bit entry as a single machine word.

Atomic hardware instructions facilitate lockless (i.e. non-blocking) thread-safe operation of hash table 410. Forgoing locks provides acceleration. The following example pseudocode demonstrates using an atomic CAS instruction to safely write an entry in hash table 410.

```
Input: Descriptor of the cacheable node desc, the cacheable
    node's value v, array of material cache matCache, the number
    of cells N_c and the number of entries N_e .
cellIdx ← Hash(desc)%N_c ;
hashVal ← Hash2(desc);
hashIdx ← -1;
for i ← 0 to N_e do
    entryIdx ← cellIdx × N_e + i;
    current ← matCache [entryIdx ];
    if current.hash = hashVal ∪ current.hash = 0 then
        hashIdx ← entryIdx ;
        break;
    end
end
if hashIdx ≠ -1 then
    encodedVal ← Encode(v);
    new ← {hashVal, encodedVal };
    old ← CAS(matCache[hashIdx], 0, new);
```

In the above pseudocode, Hash( ) and Hash2( ) are the first and second hash functions of hash table 410. The first hash value is cellIdx, and the second hash value is hashVal. In the above pseudocode, matCache[ ] is hash table 410 treated as a monolithic array of all entries of all cells as discussed earlier herein. In the above pseudocode, CAS is an atomic hardware instruction that makes hash table 410 thread safe.

F. Example Rendering Process

FIG. 5 depicts example steps 501-507 of an example computer process that path tracer 120 may perform in computing architecture 100 to render an image based on specified texture(s) and material(s).

As explained earlier herein, a node in a directed acyclic graph (DAG) of a material may be uncacheable. For example, a value of a node that is not a texel value should not be cached. Likewise, a texel value that cannot be reused should not be cached. For example, if a node that generated a texel value depends on descendant nodes in the node's subgraph, and those descendent node(s) values should not be reused, then the texel value of the node should not be cached. Step 501 detects a subset of nodes of a directed acyclic graph (DAG) of a material that should not be cached.

In one example, the DAG contains at least two nodes that correspond to different respective texture coordinates, and the texel values of those two nodes are both cacheable. Step 502 evaluates a first node (e.g. and also its subgraph) to generate a first texel value at first texture coordinates. Likewise, step 503 generates a second texel value at second texture coordinates for a second node of the DAG of the material. The first and second texel values are used to render an image or portion of the image, and the first and second texel values also are stored into hash table 410 for eventual retrieval and reuse as follows.

Step 504 uses a descriptor of the first node in the DAG to retrieve the first texel value from materials cache 150 in memory 130. Node descriptors are discussed earlier herein. Retrieval step 504 has sub-steps 505-506.

Using a same hash key based on the descriptor of the first node in the DAG, step 505 generates a first hash value from a first hash function and a second hash value from a second hash function as discussed earlier herein. Step 505 uses the first hash value as a cell offset to select a cell in hash table 410. Step 506 detects whether or not the selected cell contains an entry that contains the second hash value. In this shown example of a cache hit, step 506 affirmatively detects the corresponding entry in hash table 410 because the first texel value of the first node was previously stored into hash table 410, in which case the first node does not need reevaluation. An example not shown may instead experience a cache miss in which the second hash value is not in the selected cell. A cache miss requires evaluation of the first node (e.g. and also its subgraph) to generate a first texel value that can be rendered and cached. Whether obtained from cache or by evaluation, step 507 renders the first texel value of the first node of the DAG of the material.

G. Acceleration and Anti-aliasing with Virtual Texture

At different shading locations, different portions of a texture may be rendered. Selection of resolutions and identifications of associated portions of the texture may be dynamic decisions, which makes it challenging to define a proper resolution for a cached texel value during an evaluation of a material tree. Thus, virtual mipmapped textures are dynamically computed for a material at a shading location to store the texel value at the appropriate resolution. A mipmap is a hierarchical division of an image to be rendered at a particular mipmap level (i.e. resolution).

Figure 6:
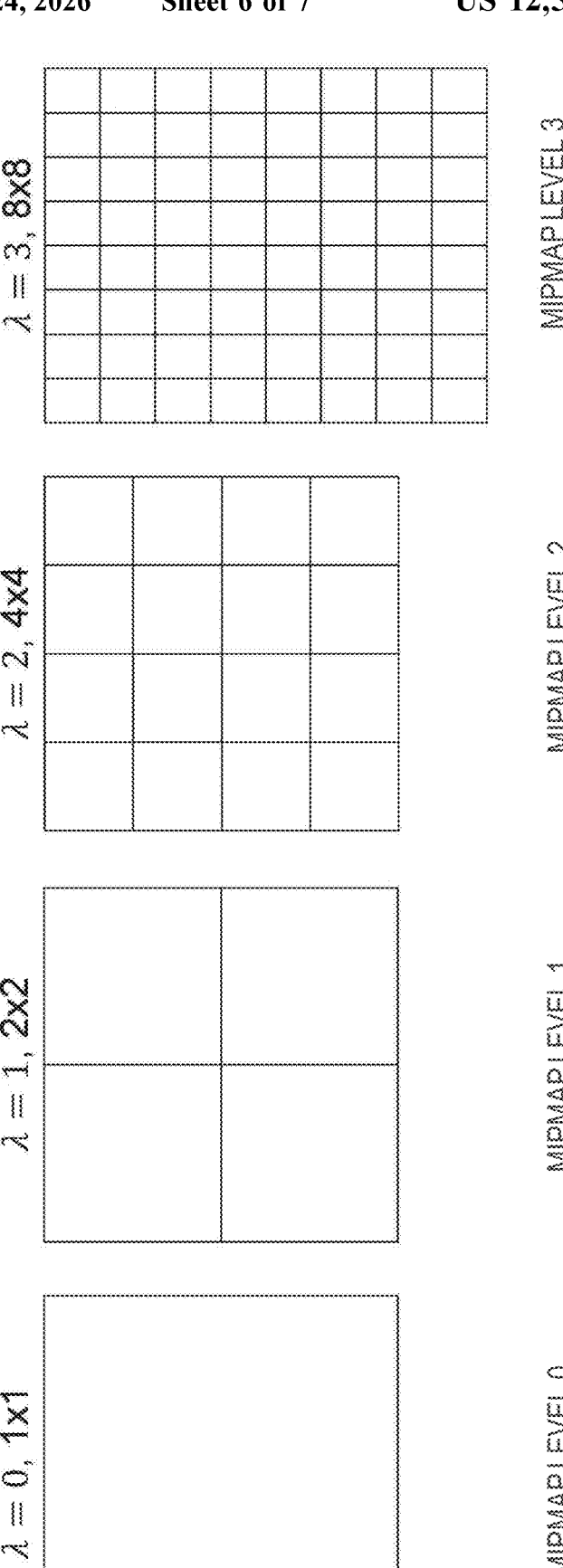
FIG. 6 depicts example mipmap levels for use with virtual textures.

FIG. 6 depicts example mipmap levels 0-3 for use with virtual textures. Mipmap level 0 has the least resolution. Evaluating a material tree at different resolutions may be unable to reuse some cached texel values. A texel of a lower resolution mipmap level covers a same area as multiple texels of a higher resolution mipmap level. For example, mipmap level 1 arranges four texels in a same area as one texel in mipmap level 0. A same texture location maps to a different single texel in each of mipmap levels 0-3. In other words, multiple texel values (at different resolutions) may be cached for a same texture location. In that case, the texture location and the node of the material tree may be insufficient to identify a texel in materials cache 150, texel indices for virtual textures, and a mipmap level should be part of the hash key and node descriptor.

A technical problem with caching a same texture at different mipmap levels is that some or all of the material tree may be reevaluated or structurally duplicated for multiple mipmap levels, which is slow to prepare and, in the state of the art, is eagerly precalculated as multiple texel values (respectively for multiple mipmap levels) even if never used. For example, the state of the art may need a separate material tree for each mipmap level.

Figure 7:
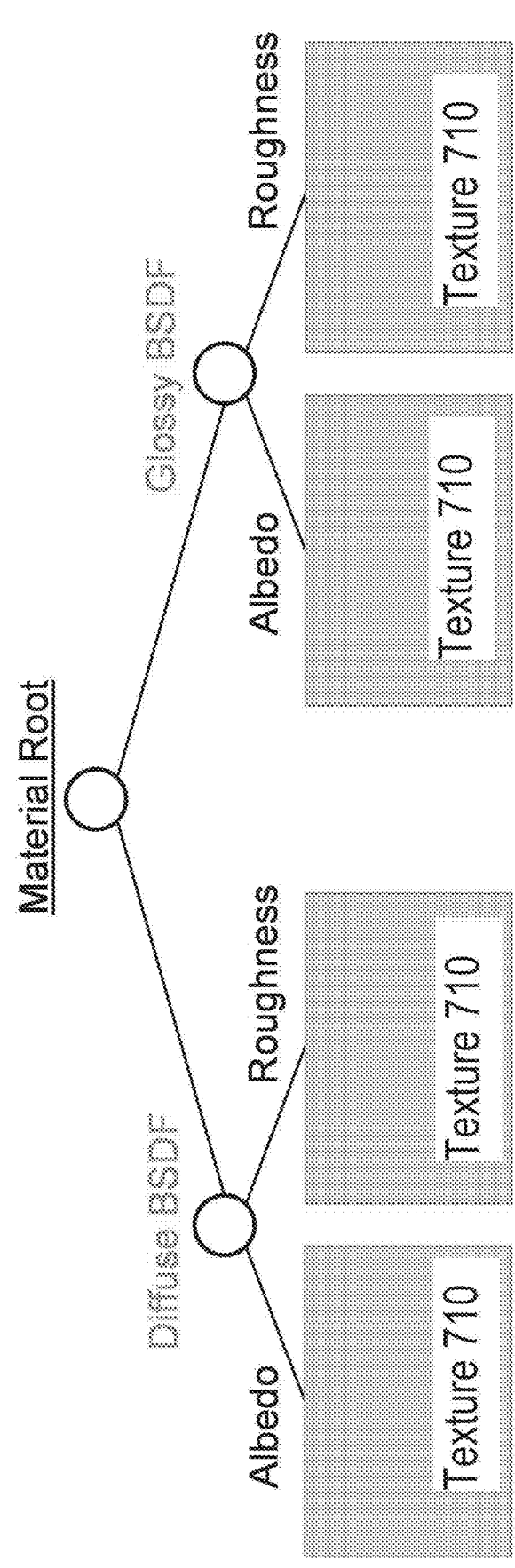
FIG. 7 depicts an example material tree that contains virtual textures that synergize with a materials cache to lazily defer generation of texel values until dynamically needed at any particular mipmap level.

FIG. 7 depicts example material tree 700 that contains multiple cacheable nodes that reference same virtual texture 710 that synergizes with materials cache 150 to, unlike the state of the art, lazily defer generation of texel values until dynamically needed at any particular mipmap level. For example, the mipmap level may be part of the node descriptor and hash key of a texel value in materials cache 150. Identification or allocation of a subset of texels of a virtual texture may be deferred until needed, which may entail geometric analytics such as identifying texels in a (e.g. elliptic) silhouette projected by a ray cone onto the surface. The mipmap level may depend on the elliptic silhouette according to the following example mipmap level formula.

$$\lambda = -\log_2(\min(\|g \rightarrow_1\|, \|g \rightarrow_2\|))$$

In the above mipmap level formula, $g \rightarrow_1$ and $g \rightarrow_2$ are texture-coordinate gradients that are used to calculate both axes of the ellipse. In the above mipmap level formula, the result is $\lambda$ that is a dynamic mipmap level.

Unlike the state of the art, a virtual texture is reused to generate texel values for a dynamically selected mipmap level. Because texels of a virtual texture are lazily generated on demand, generation of many or most texels is deferred or entirely avoided. Lazy texel generation means that a virtual texture may be quickly generated when generating a material tree, and the virtual texture consumes little additional memory so long as only a few of its texels actually become allocated. Thus, generation of many virtual textures at various mipmap levels may contribute many nodes to material tree(s) without adding latency nor consuming significant memory.

What is claimed is:

1. A device comprising:
   a processor; and
   a path tracer configured to use a descriptor of a node in a directed acyclic graph (DAG) that represents a material to retrieve a texel value from a materials cache in a memory, including:
      generate, based on the descriptor of the node in the DAG that represents the material, a first hash code and a second hash code; and
      detect that the second hash code is stored in a hash cell that is identified by the first hash code.

2. The device of claim 1, further configured to use an atomic hardware instruction to store, into the hash cell, at least one selected from the group consisting of the second hash code and the texel value.

3. The device of claim 1, further configured to store, into the hash cell, a machine word that contains the second hash code and the texel value.

4. The device of claim 1, wherein the path tracer is further configured to:
   detect that a second hash code of a descriptor of a second node in the DAG that represents the material is not in a hash cell that is identified by a first hash code of the descriptor of the second node;
   detect that the hash cell is full;
   wherein the device is not configured to evict a texel value from the materials cache in response to the hash cell being full.

5. The device of claim 1, wherein a value range for the first hash code is larger than a value range for the second hash code.

6. The device of claim 1, wherein the first hash code is based on a UV value.

7. The device of claim 1, wherein the descriptor of the node in the DAG that represents the material specifies at least one selected from the group consisting of a mipmap level and texel indices for a virtual texture.

8. The device of claim 1, wherein the path tracer is further configured to in sequence:
   a) perform a texel operation selected from the group consisting of:
      generate the texel value for a particular texture coordinates,
      store, into the materials cache, the texel value for a particular texture coordinates, and
      render, based on the texel value for a particular texture coordinates from the materials cache, the node of the DAG of the material;
   b) generate a second texel value for a second particular texture coordinates in a second node of the DAG of the material.

9. The device of claim 1, further configured to in sequence:
   detect a subset of nodes of the DAG of the material that should not be cached;
   store the texel value in the materials cache.

10. The device of claim 1, further configured to detect that the node of the DAG of the material is a root of a subgraph of the DAG that does not contain a node that depends on an attribute of a shading point that is not a texture coordinates of the shading point.

11. The device of claim 1, further configured to:

dynamically generate a new virtual texture for a particular resolution;

store, in the materials cache and based on the particular resolution of the new virtual texture, said texel value for a particular texture coordinates in the node of the DAG of the material.

12. The device of claim 1, further configured to multi-thread the materials cache without a lock.

13. The device of claim 1, wherein the path tracer is not configured for dynamic kernel generation for an individual material.

14. The device of claim 1, wherein the processor comprises at least one selected from a group consisting of the path tracer, a central processing unit, a graphics processing unit, and a programmed controller.

15. A method comprising:

retrieving, by a path tracer having a descriptor of a node in a directed acyclic graph (DAG) that represents a material, a texel value from a materials cache in a memory, including:

generating, based on the descriptor of the node in the DAG that represents the material, a first hash code and a second hash code; and detecting that the second hash code is stored in a hash cell that is identified by the first hash code.

16. The method of claim 15, further comprising performing in sequence by the path tracer:

a) performing a texel operation selected from the group consisting of:

generating the texel value for a particular texture coordinates, storing, into the materials cache, the texel value for a particular texture coordinates, and rendering, based on the texel value for a particular texture coordinates from the materials cache, the node of the DAG of the material;

b) generating a second texel value for a second particular texture coordinates in a second node of the DAG of the material.

17. The method of claim 15, further comprising detecting that the node of the DAG of the material is a root of a subgraph of the DAG that does not contain a node that depends on an attribute of a shading point that is not a texture coordinates of the shading point.

18. The method of claim 15, further comprising:

dynamically generating a new virtual texture for a particular resolution;

storing, in the materials cache and based on the particular resolution of the new virtual texture, said texel value for a particular texture coordinates in the node of the DAG of the material.

19. The method of claim 15, further comprising:

detecting that a second hash code of a descriptor of a second node in the DAG that represents the material is not in a hash cell that is identified by a first hash code of the descriptor of the second node;

detecting that the hash cell is full;

wherein the method is performed on a device that is not configured to evict a texel value from the materials cache in response to the hash cell being full.

20. The method of claim 15, further comprising detecting that the node of the DAG of the material is a root of a subgraph of the DAG that does not contain a node that depends on an attribute of a shading point that is not a texture coordinates of the shading point.

* * * * *